United States Patent
Reich

(10) Patent No.: US 6,839,667 B2
(45) Date of Patent: Jan. 4, 2005

(54) METHOD OF SPEECH RECOGNITION BY PRESENTING N-BEST WORD CANDIDATES

(75) Inventor: David E. Reich, Jupiter, FL (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 09/858,399

(22) Filed: May 16, 2001

(65) Prior Publication Data

US 2002/0173955 A1 Nov. 21, 2002

(51) Int. Cl.⁷ .............................................. G10L 15/22
(52) U.S. Cl. ..................... 704/240; 704/239; 704/255
(58) Field of Search ................................ 704/231, 236, 704/239, 240, 251, 255, 235, 250, 254, 260

(56) References Cited

U.S. PATENT DOCUMENTS

| | | | | |
|---|---|---|---|---|
| 5,625,748 A | * | 4/1997 | McDonough et al. | 704/251 |
| 5,712,957 A | * | 1/1998 | Waibel et al. | 704/240 |
| 5,842,163 A | * | 11/1998 | Weintraub | 704/240 |
| 5,855,000 A | * | 12/1998 | Waibel et al. | 704/235 |
| 6,029,124 A | * | 2/2000 | Gillick et al. | 704/200 |
| 6,076,059 A | * | 6/2000 | Glickman et al. | 704/260 |
| 6,125,345 A | * | 9/2000 | Modi et al. | 704/240 |
| 6,233,553 B1 | * | 5/2001 | Contolini et al. | 704/220 |
| 6,539,353 B1 | * | 3/2003 | Jiang et al. | 704/254 |
| 6,571,210 B2 | * | 5/2003 | Hon et al. | 704/251 |

* cited by examiner

Primary Examiner—Susan McFadden
(74) Attorney, Agent, or Firm—Akerman Senterfitt

(57) ABSTRACT

A method for performing speech recognition can include receiving user speech and determining a plurality of potential candidates. Each of the candidates can provide a textual interpretation of the speech. Confidence scores can be calculated for the candidates. The confidence scores can be compared to a predetermined threshold. Also, selected ones of the plurality of candidates can be presented to the user as alternative interpretations of the speech when none of the confidence scores is greater than the predetermined threshold. The selected ones of the plurality of candidates can have confidence scores above a predetermined minimum threshold, and thus can have confidence scores within a predetermined range.

22 Claims, 2 Drawing Sheets

METHOD OF SPEECH RECOGNITION BY PRESENTING N-BEST WORD CANDIDATES

BACKGROUND OF THE INVENTION

1. Technical Field

This invention relates to the field of speech recognition, and more particularly, to a method of improving speech recognition through the use of an N-best list and confidence scores.

2. Description of the Related Art

Speech recognition is the process by which an acoustic signal received by microphone is converted to a set of text words, numbers, or symbols by a computer. These recognized words may then be used in a variety of computer software applications for purposes such as document preparation, data entry, and command and control. Improvements to speech recognition systems provide an important way to enhance user productivity.

Speech recognition systems can model and classify acoustic signals to form acoustic models, which are representations of basic linguistic units referred to as phonemes. Upon receiving and digitizing an acoustic speech signal, the speech recognition system can analyze the digitized speech signal, identify a series of acoustic models within the speech signal, and derive a list of potential word candidates corresponding to the identified series of acoustic models. Notably, the speech recognition system can determine a measurement reflecting the degree to which the potential word candidates phonetically match the digitized speech signal.

Speech recognition systems also can analyze the potential word candidates with reference to a contextual model. This analysis can determine a probability that one of the word candidates accurately reflects received speech based upon previously recognized words. The speech recognition system can factor subsequently received words into the probability determination as well. The contextual model, often referred to as a language model, can be developed through an analysis of many hours of human speech. Typically, the development of a language model can be domain specific. For example, a language model can be built reflecting language usage within a legal context, a medical context, or for a general user.

The accuracy of speech recognition systems is dependent on a number of factors. One such factor can be the context of a user spoken utterance. In some situations, for example where the user is asked to spell a word, phrase, number, or an alphanumeric string, little contextual information can be available to aid in the recognition process. In these situations, the recognition of individual letters or numbers, as opposed to words, can be particularly difficult because of the reduced contextual references available to the speech recognition system. This can be particularly acute in a spelling context, such as where a user provides the spelling of a name. In other situations, such as a user specifying a password, the characters can be part of a completely random alphanumeric string. In that case, a contextual analysis of previously recognized characters offers little, if any, insight as to subsequent user speech.

Still, situations can arise in which the speech recognition system has little contextual information from which to recognize actual words. For example, when a term of art is uttered by a user, the speech recognition system can lack a suitable contextual model to process such terms. Thus, once the term of art is encountered, similar to the aforementioned alphanumeric string situation, that term of art provides little insight for predicting subsequent user speech.

Another factor which can affect the recognition accuracy of speech recognition systems can be the quality of an audio signal. Oftentimes, telephony systems use low quality audio signals to represent speech. The use of low quality audio signals within telephony systems can exacerbate the aforementioned problems because a user is likely to provide a password, name, or other alphanumeric string on a character by character basis when interacting with an automated computer-based systems over the telephone.

SUMMARY OF THE INVENTION

The invention disclosed herein provides a method for performing speech recognition. In particular, the invention can determine that a high likelihood exists that a recognition result does not accurately reflect received user speech. Such determinations can be made using a confidence score generated by the speech recognition system. In cases where the confidence score is below a predetermined threshold, one or more potential word candidates, each being a potentially accurate recognition result corresponding to the received user speech, can be identified. The speech recognition system can query the user as to which of the potential word candidates is an accurate recognition result for the received user speech. Though the invention can be used with words, the invention can be particularly useful in recognizing individual characters, such as in the context of a user specifying a character string on a character by character basis.

One aspect of the present invention can include a method for performing speech recognition including receiving user speech and determining a plurality of potential candidates. Each of the candidates can provide a textual interpretation of the user speech. Confidence scores for the candidates can be calculated. The confidence scores can be compared to a predetermined threshold. Selected ones of the plurality of candidates can be presented to the user as alternative interpretations of the user speech if none of the confidence scores is greater than the predetermined threshold. Notably, the selected ones of the plurality of candidates can have corresponding confidence scores above a predetermined minimum threshold, and thus can have confidence scores within a predetermined range.

The method further can include receiving a user input specifying one of the selected ones of the plurality of candidates as a correct recognition result corresponding to the user speech. The selected ones of the plurality of candidates can be presented in a graphical format or through an audio user interface. Notably, the user speech can specify a character. Also, at least one of the selected ones of the plurality of candidates can be a character.

Another aspect of the invention can include a method for performing speech recognition including receiving user speech and determining a plurality of potential candidates. Notably, the user speech can specify a character. Also, at least one of the selected ones of the plurality of candidates can be a character. Each candidate can provide a textual interpretation of the user speech. Confidence scores for the candidates can be calculated and compared to a predetermined threshold. A selected group of the plurality of candidates can be determined. Notably, the selected group of the plurality of candidates can have corresponding confidence scores above a predetermined minimum threshold, and thus can have confidence scores within a predetermined range.

The user can be queried to identify one candidate of the selected group as a correct recognition result corresponding to the user speech if none of the confidence scores is greater than the predetermined threshold. The method further can include receiving a user input specifying one of the selected ones of the plurality of candidates as a correct recognition result corresponding to the user speech.

Yet another aspect of the invention can include a method for performing speech recognition including receiving user speech and determining a recognition result for the speech. The recognition result can have a corresponding confidence score. The confidence score of the recognition result can be compared to a predetermined minimum threshold. If the conference score is less than the minimum threshold, at least one word candidate can be presented as an alternative interpretation of the speech. The word candidate can be determined by a speech recognition engine based upon the user speech and a confidence score.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Figure 1:
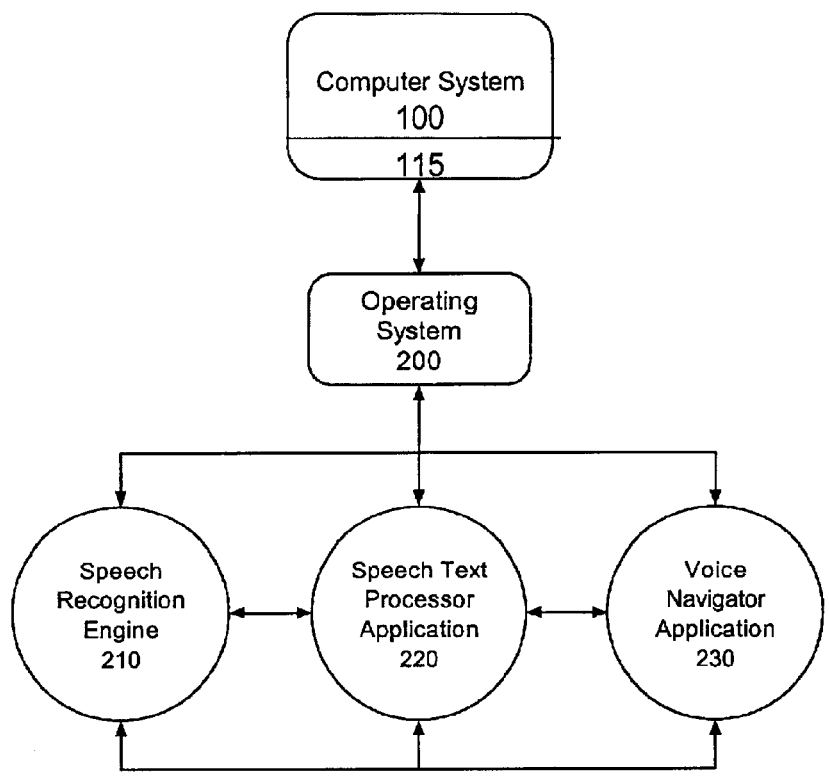
FIG. 1 is a schematic diagram depicting an exemplary architecture for speech recognition in accordance with the inventive arrangements.

The invention disclosed herein provides a method for performing speech recognition. In particular, the invention can determine that a high likelihood exists that a recognition result does not accurately reflect received user speech. Such determinations can be made using a confidence score generated by the speech recognition system. Specifically, in cases where the confidence score is below a predetermined threshold, one or more potential word candidates, each being a potential accurate recognition result corresponding to the received user speech, can be identified. The word candidates can be one or more individual characters, words, or phrases. The speech recognition system can query the user as to which of the potential word candidates is an accurate recognition result for the received user speech. Thus, rather than informing a user that the last user spoken utterance was not understood, or asking the user to repeat the last utterance, the invention enables a speech recognition system to function in a human-like manner by asking the user which candidate is the correct recognition result.

Though the invention can be used with words, the invention can be particularly useful in recognizing individual characters such as letters, numbers, and symbols, including international symbols and other character sets. Accordingly, the present invention can be used in the context of a user specifying a character string on a character by character basis. For example, the invention can be used when a user provides a password over a telephone connection. In that case, any previously recognized characters of the password provide little or no information regarding a next character to be received and recognized. Accordingly the language model provides little help to the speech recognition system. For instance, if the user utters the letter "F", the speech recognition system can accurately recognize the user spoken utterance as the letter "F". If the confidence level is not above a predetermined threshold, however, the speech recognition system can present the user with one or more candidates as determined during the recognition process. Notably, the candidates can be a predetermined number "N" candidates having the highest "N" confidence scores. Thus, the speech recognition system can query the user by asking "Did you say 'F' as in 'Frank' or 'S' as in 'Sam'". In this case, the speech recognition system has asked the user to choose between the two candidates having the highest confidence scores. The invention, however, is not so limited and the number of candidates presented can be programmed or user configurable. The prompts can be programmed to include a word that begins with each candidate. In this case "Frank" and "Sam" can be included within an audio prompt wherein "Frank" begins with the word candidate "F"; and, "Sam" which begins with the word candidate "S". Thus, the user can respond with the entire phrase "'F' as in 'Frank'", which the speech recognition system can recognize more readily.

A typical computer system can be used in conjunction with the present invention. The system can include a computer having a central processing unit (CPU), one or more memory devices, and associated circuitry. The memory devices can be comprised of an electronic random access memory and a bulk data storage medium. The system also can include a microphone operatively connected to the computer system through suitable interface circuitry 125, and an optional user interface display unit such as a video data terminal operatively connected thereto. The CPU can be comprised of any suitable microprocessor or other electronic processing unit, as is well known to those skilled in the art. Speakers, as well as interface devices, such as a mouse and a keyboard, can be provided with the system, but are not necessary for operation of the invention as described herein. The various hardware requirements for the computer system as described herein generally can be satisfied by any one of many commercially available high-speed computers.

FIG. 1 is a schematic diagram illustrating a typical architecture for a speech recognition system in a computer 100 such as the previously described computer system. As shown in FIG. 1, within the memory 115 of computer system 100 can be an operating system 200 and a speech recognition engine 210. Also included can be a speech text processor application 220 and a voice navigator application 230. The invention, however, is not limited in this regard and the speech recognition engine 210 can be used with any other application program which is to be voice enabled. In FIG. 1, the speech recognition engine 210, speech text processor application 220, and the voice navigator application 230 are shown as separate application programs. It should be noted, however, that the invention is not limited in this regard, and these various application programs can be implemented as a single, more complex application program. For example, the speech recognition engine 210 can be combined with the speech text processor application 220 or with any other application to be used in conjunction with the speech recognition engine 210. Also, if no other speech controlled application programs are to be operated in conjunction with the speech text processor application 220 and speech recognition engine 210, the system can be modified to operate without the voice navigator application 230. The voice navigator application 230 primarily helps coordinate the operation of the speech recognition engine 210.

In operation, audio signals representative of sound received through a microphone can be processed within computer 100 using conventional computer audio circuitry so as to be made available to the operating system 200 in digitized form. Alternatively, audio signals can be received via a computer communications network from another computer system in analog or digital format or from another transducive device such as a telephone. The audio signals received by the computer system 100 are conventionally provided to the speech recognition engine 210 via the computer operating system 200 in order to perform speech recognition functions. As in conventional speech recognition systems, the audio signals can be processed by the speech recognition engine 210 to identify words spoken by a user into the microphone.

Figure 2:
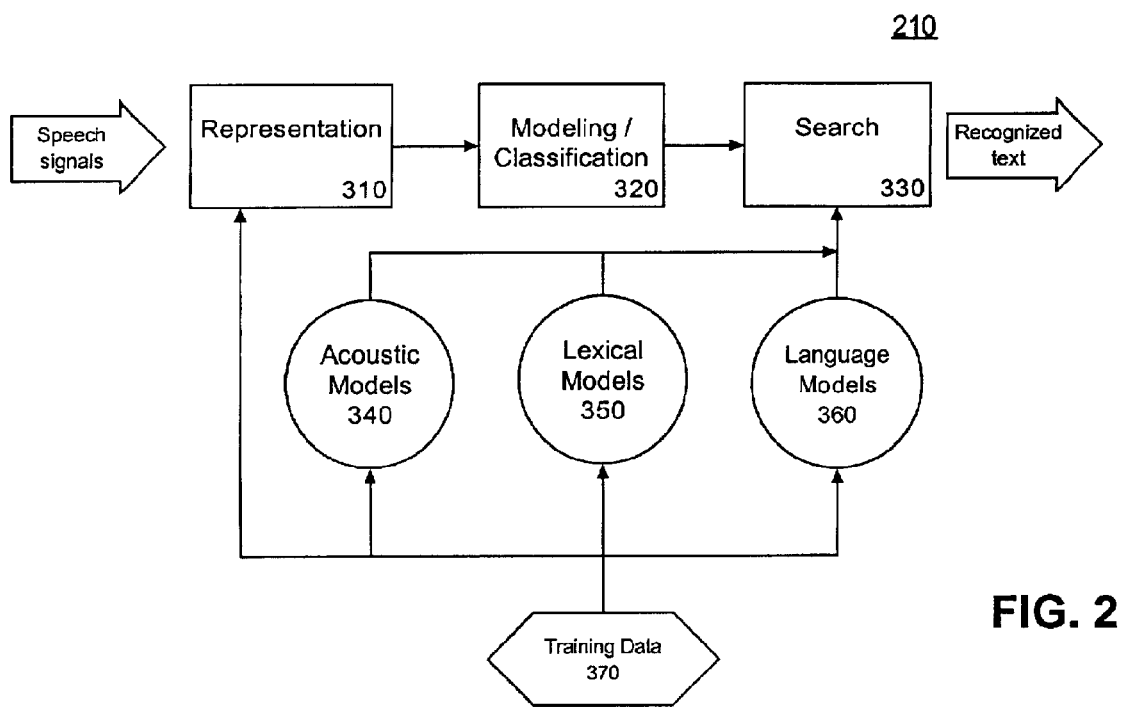
FIG. 2 is a block diagram showing typical components which can comprise a speech recognition engine in accordance with the inventive arrangements.

FIG. 2 is a block diagram showing typical components which can comprise speech recognition engine 210. As shown in FIG. 2 the speech recognition engine 210 receives a digitized speech signal from the operating system. The system is subsequently transformed in representation block 310 into a useful set of data by sampling the signal at some fixed rate, typically every 10–20msec. The representation block produces a new representation of the audio signal which then can be used in subsequent stages of the voice recognition process to determine the probability that the portion of the wave form just analyzed corresponds to a particular phonetic event. This process is intended to emphasize perceptually important speaker independent features of the speech signals received from the operating system. In modeling/classification block 320, the speech signals are processed further to adapt speaker-independent acoustic models to those of the current speaker. Finally, in search block 330, search algorithms are used to guide the search engine to the most likely words corresponding to the speech signal. The search block 330 occurs with the help of acoustic models 340, lexical models 350, and language models 360.

The invention can utilize a confidence score as part of the recognition process. A confidence score, which is well known in the art, reflects the likelihood that a particular word candidate or series of word candidates, as determined by the speech recognition system, accurately reflects the corresponding user spoken utterance. The confidence score can be a value derived from a comparison of the speech signal to acoustic models, lexical models, and language models using statistical processing techniques known in the art. For example, the confidence score can take into account the likelihood that a particular word candidate or word candidates represent a user spoken utterance as determined using an acoustic model, in addition to the probability that the particular word candidate can be located next to another word or group of words as determined using a language model. It should be appreciated that the confidence score can be expressed in any of a variety of formats or conventions. In one embodiment, the confidence score can be expressed as a normalized numerical value.

Figure 3:
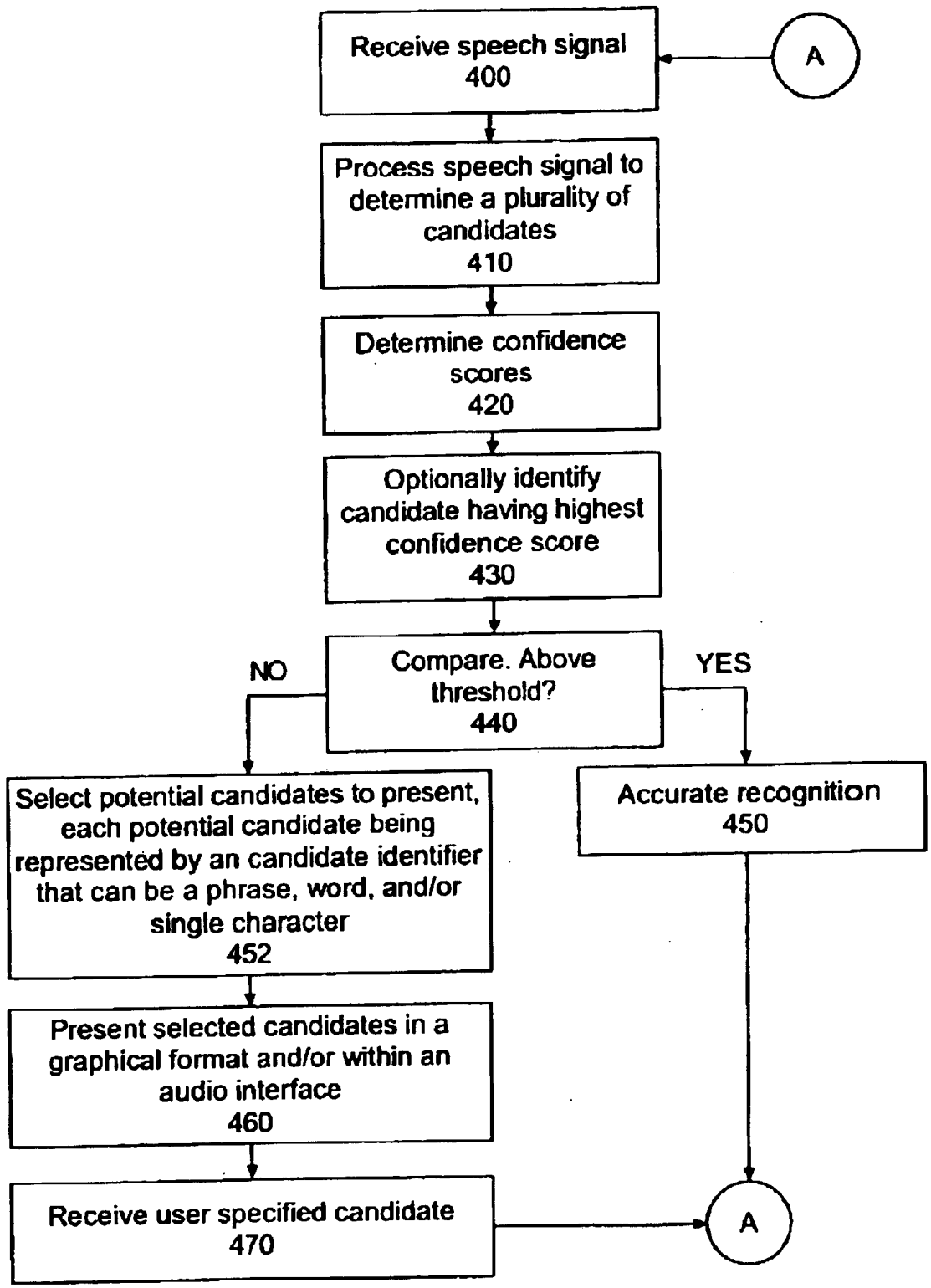
FIG. 3 is a flow chart illustrating an exemplary method of presenting a user with alternate word candidates.

FIG. 3 is a flow chart illustrating an exemplary method for performing speech recognition in accordance with the inventive arrangements. The method illustrated in FIG. 3 can begin in a state wherein a user is providing a user spoken utterance. Consequently, the user utterance can be digitized and provided to the speech recognition system for processing. In step 400, the system can receive a speech signal. For example, a speech signal representative of a user spoken word such as "F" or "fun" can be received.

In step 410, the speech signal can be processed to determine one or more word candidates. The number of word candidates determined by the speech recognition system can be a preprogrammed number of word candidates. Alternatively, the number of word candidates can be user adjustable such that the user can control the amount of processing power the speech recognition system can devote to the determination of word candidates. For example, the speech recognition system can determine that "S", "X", and "F" are word candidates corresponding to the received speech signal specifying "F". Similarly, if the user speech specified the word "fun", the alternates can include "fun" and "sun". After completion of step 410, the method can proceed to step 420.

In step 420, a confidence score can be determined for the word candidates. Taking the previous example, the word candidates can have the following confidence scores: "S"= 0.69, "X"=0.65, and "F"=0.71. In step 430, the word candidate having the highest confidence score can be identified. Thus, the word candidate "F" having a confidence score of 0.71can be identified. After completion of step 430, the method can continue to step 440.

In step 440, a determination can be made as to whether the highest confidence score is above a predetermined threshold. Accordingly, the confidence score of 0.71 corresponding to the word candidate "F" can be compared to the predetermined threshold. The predetermined threshold can be a programmed or a user adjustable value. In any case, the threshold can represent the minimum confidence score needed to be considered an accurate recognition result by the speech recognition system. Thus, if the highest confidence score of the word candidates is equal to or above the predetermined threshold, a high likelihood exists that the recognition result is accurate. For example, if the threshold is set to 0.70, the word candidate "F" can be determined to be an accurate recognition result. In that case the method can continue to step 450 where the word candidate "F" can be noted as being an accurate recognition result. The result can be provided to the user or another application program. In any case, the method can proceed to jump circle A and repeat as necessary.

If, however, the highest confidence score of the word candidates is below the predetermined threshold, an unacceptable likelihood exists that the recognition result is inaccurate. For example, if the predetermined threshold is set to 0.75, neither the word candidate with the highest confidence score, nor the other word candidates provide a recognition result which the speech recognition system can consider accurate. In that case, the method can continue to step 452.

In step 452, potential candidates can be selected. The potential candidates can be represented by a candidate identifier. The candidate identifier can be any identifier, such as a phrase, word, and/or single character that can be used to differentiate the potential candidates from one another. That is, when promoted to select a potential candidate, a user can identity one of the potential candidates by inputting the candidate identifier associated with a desired candidate.

In step 460, the selected candidates can be presented to the user. It should be appreciated that the number of selected candidates can be a programmed value or a user adjustable value. Further, the number of selected candidates need not be the same as the number of determined word candidates of step 410. In an alternative embodiment, the speech recognition system can use a minimum confidence score threshold to determine the candidates to select. In that case, if an accurate recognition result has not been determined, any candidate having a confidence score equal to or greater than the predetermined minimum threshold can be presented to the user.

The word candidates can be presented to the user in a variety of formats. In one embodiment, the word candidates can be presented as text selections. For example within a graphical user interface the user can be asked to specify one of the word candidates "F", "S", or "X" as the correct recognition result. In another embodiment, the word candidates can be presented to the user through an audio user interface, for example utilizing recorded audio or text-to-speech technology, which is known in the art. For instance, if the user speech specified the word "fun", the user can be prompted using an audio prompt to specify one of the word candidates "fun" or "sun" as a correct recognition result. Still, in the case of character recognition using audio prompts, if the user said "f", the user can be prompted as follows: "Did you say 'f' as in 'Frank' or 's' as in 'Sam'". After completion of step 460, the method can continue to step 470.

In another embodiment of the invention, if the highest confidence score is above the predetermined threshold for an accurate recognition, but still less than or equal to a second predetermined threshold set above the accurate recognition threshold, the speech recognition system still can present the user with the "N" best word candidates. For example, although the speech recognition system determined that a particular word candidate is an accurate recognition, the speech recognition system can perform an added check or confirmation when the confidence score is not significantly higher than the predetermined threshold for determining an accurate recognition.

In yet another embodiment of the invention, the speech recognition system can include a predetermined minimum threshold. In that case, only the "N" best word candidates having a corresponding confidence score above that threshold can be presented to the user. Accordingly, the word candidates presented to the user can have confidence scores within a predetermined range. The range can have a lower bound defined by the predetermined minimum threshold. The upper bound can be defined by either the accurate recognition threshold or the second predetermined threshold above the accurate recognition threshold depending upon the implementation. Thus, if none of the word candidates have confidence scores above the predetermined minimum threshold, which is less than the threshold for an accurate recognition, the speech recognition system can determine that no viable word candidates exist. Accordingly, the speech recognition system can decline to present word candidates to the user and can return a message that the user spoken utterance was not recognized.

In step 470, the user can select the word candidate corresponding to the correct recognition result. The user selection, which can be a speech input, a pointer click or event, or a keyboard entry, can be received and specify the correct recognition result. After completion of step 470, the method can repeat as necessary.

The present invention can be realized in hardware, software, or a combination of hardware and software. In accordance with the inventive arrangements, the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The system disclosed herein can be implemented by a programmer, using commercially available development tools for the particular operating system used. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other specific forms without departing from the spirit or essential attributes thereof, and accordingly reference should be made to the following claims, rather than to the foregoing specification, as indicating the scope of the invention.

What is claimed is:

1. A method for performing speech recognition comprising:

receiving user speech;

determining a plurality of potential candidates, each potential candidate providing a textual interpretation of said speech;

calculating confidence scores for said plurality of candidates and comparing said confidence scores to a predetermined threshold; and automatically presenting selected ones of said plurality of candidates as alternative interpretations of said speech if none of said confidence scores is greater than said predetermined threshold.

2. The method of claim 1, wherein said selected ones of said plurality of candidates have corresponding confidence scores above a predetermined minimum threshold.

3. The method of claim 1, further comprising:

receiving a user input specifying one of said selected ones of said plurality of candidates as a correct recognition result corresponding to said speech.

4. The method of claim 1, wherein selected ones of said plurality of candidates are presented in a graphical format.

5. The method of claim 1, wherein said selected ones of said plurality of candidates are presented using an audio user interface.

6. The method of claim 1, wherein said speech specifies a character, and at least one of said selected ones of said plurality of candidates is a character.

7. A method for performing speech recognition comprising:

receiving user speech;

determining a plurality of potential candidates, each potential candidate providing a textual interpretation of said speech;

calculating confidence scores for said plurality of canitates and comparing said confidence scores to a predetermined threshold;

identifying a selected group of said plurality of candidates; and querying a user to identify one candidate of said selected group as a correct recognition result corresponding to said speech if none of said confidence scores is greater than said predetermined threshold.

8. The method of claim 7, wherein said selected group of said plurality of candidates have corresponding confidence scores above a predetermined minimum threshold.

9. The method of claim 7, further comprising:
receiving a user input specifying one of said selected ones of said plurality of candidates as a correct recognition result corresponding to said speech.

10. The method of claim 7, wherein said speech specifies a character, and at least one of said selected ones of said plurality of candidates is a character.

11. A method for performing speech recognition comprising:
receiving user speech;
determining a recognition result for said speech, said recognition result having a corresponding confidence score;
comparing said confidence score of said recognition result to a predetermined minimum threshold; and
if said confidence score is less than said minimum threshold, presenting at least one word candidate as an alternative interpretation of said speech, said word candidate being determined by a speech recognition engine based upon said user speech and a confidence score.

12. A machine readable storage, having stored thereon a computer program having a plurality of code sections executable by a machine for causing the machine to perform the steps of:
receiving user speech;
determining a plurality of potential candidates, each potential candidate providing a textual interpretation of said speech;
calculating confidence scores for said plurality of candidates and comparing said confidence scores to a predetermined threshold; and
automatically presenting selected ones of said plurality of candidates as alternative interpretations of said speech if none of said confidence scores is greater than said predetermined threshold.

13. The machine readable storage of claim 12, wherein said selected ones of said plurality of candidates have corresponding confidence scores above a predetermined minimum threshold.

14. The machine readable storage of claim 12, further comprising:
receiving a user input specifying one of said selected ones of said plurality of candidates as a correct recognition result corresponding to said speech.

15. The machine readable storage of claim 12, wherein selected ones of said plurality of candidates are presented in a graphical format.

16. The machine readable storage of claim 12, wherein said selected ones of said plurality of candidates are presented using an audio user interface.

17. The machine readable storage of claim 12, wherein said speech specifies a character, and at least one of said selected ones of said plurality of candidates is a character.

18. A machine readable storage, having stored thereon a computer program having a plurality of code sections executable by a machine for causing the machine to perform the steps of:
receiving user speech;
determining a plurality of potential candidates, each potential candidate providing a textual interpretation of said speech;
calculating confidence scores for said plurality of candidates and comparing said confidence scores to a predetermined threshold;
identifying a selected group of said plurality of candidates; and
querying a user to identify one candidate of said selected group as a correct recognition result corresponding to said speech if none of said confidence scores is greater than said predetermined threshold.

19. The machine readable storage of claim 18, wherein said selected group of said plurality of candidates have corresponding confidence scores above a predetermined minimum threshold.

20. The machine readable storage of claim 18, further comprising:
receiving a user input specifying one of said selected ones of said plurality of candidates as a correct recognition result corresponding to said speech.

21. The machine readable storage of claim 18, wherein said speech specifies a character, and at least one of said selected ones of said plurality of candidates is a character.

22. A machine readable storage, having stored thereon a computer program having a plurality of code sections executable by a machine for causing the machine to perform the steps of:
receiving user speech;
determining a recognition result for said speech, said recognition result having a corresponding confidence score;
comparing said confidence score of said recognition result to a predetermined minimum threshold; and
if said confidence score is less than said minimum threshold, presenting at least one word candidate as an alternative interpretation of said speech, said word candidate being determined by a speech recognition engine based upon said user speech and a confidence score.

* * * * *